US010876668B2

(12) United States Patent
Rogers (10) Patent No.: US 10,876,668 B2
(45) Date of Patent: Dec. 29, 2020

(54) PRECHARGE MANIFOLD SYSTEM AND METHOD

(71) Applicant: Performance Pulsation Control, Inc., Richardson, TX (US)

(72) Inventor: John Thomas Rogers, Garland, TX (US)

(73) Assignee: Performance Pulsation Control, Inc., Richardson, TX (US)

( * ) Notice: Subject to any disclaimer, the term of this patent is extended or adjusted under 35 U.S.C. 154(b) by 8 days.

(21) Appl. No.: 16/440,622

(22) Filed: Jun. 13, 2019

(65) Prior Publication Data

US 2019/0383434 A1    Dec. 19, 2019

Related U.S. Application Data

(60) Provisional application No. 62/684,531, filed on Jun. 13, 2018.

(51) Int. Cl.
| | |
|---|---|
| *F16L 55/05* | (2006.01) |
| *F17D 1/20* | (2006.01) |
| *F16L 41/02* | (2006.01) |
| *F17D 5/00* | (2006.01) |
| *G01L 19/06* | (2006.01) |
| *G01L 19/00* | (2006.01) |

(52) U.S. Cl.
CPC ............ *F16L 55/05* (2013.01); *F16L 41/02* (2013.01); *F17D 1/20* (2013.01); *F17D 5/00* (2013.01); *G01L 19/0007* (2013.01); *G01L 19/0609* (2013.01); *F16L 41/023* (2013.01)

(58) Field of Classification Search
CPC ......... F16L 55/05; F16L 41/02; F16L 41/023; F17D 1/20; F17D 5/00; G01L 19/0007; G01L 19/0609; Y10T 137/2562

USPC .......................................................... 137/110
See application file for complete search history.

(56) References Cited

U.S. PATENT DOCUMENTS 2,731,984 A    1/1956 Everett
3,079,121 A *  2/1963 Griffing ................ F16L 55/055
                                              251/28

(Continued)

FOREIGN PATENT DOCUMENTS

DE         19706578 A1    10/1998

OTHER PUBLICATIONS

Notification of Transmittal of the International Search Report and the Written Opinion of the International Searching Authority, or the Declaration dated Sep. 4, 2019 in connection with International Patent Application No. PCT/US2019/37037, 7 pages.

*Primary Examiner* — William M McCalister (57) ABSTRACT

A pulsation dampener system is provided. The pulsation dampener system includes a pump that pumps fluid through the pulsation dampener system. A pulsation dampener is located downstream from the pump and dampens pulsations within the fluid. A pressure sensor is located downstream from the pump and detects a pump pressure of the fluid at the pulsation dampener. A wye pipe located downstream of the pulsation dampener and the pressure sensor that diverts the fluid into two or more flow paths. From the wye, a first flow path increases pump pressure of the fluid and a second flow path allows the fluid to flow unrestricted. Piping receives the fluid from the first flow path and the second flow path and discharges the fluid further downstream.

20 Claims, 5 Drawing Sheets

(56) References Cited

U.S. PATENT DOCUMENTS

| | | | | |
|---|---|---|---|---|
| 3,933,172 A | * | 1/1976 | Allen | F16K 7/07 |
| | | | | 137/494 |
| 4,004,607 A | * | 1/1977 | Freese | F16K 17/20 |
| | | | | 137/486 |
| 4,359,134 A | | 11/1982 | Jackson | |
| 4,514,151 A | | 4/1985 | Anders et al. | |
| 5,954,031 A | | 9/1999 | Ogiso et al. | |
| 6,085,792 A | * | 7/2000 | Cooper | F16L 55/041 |
| | | | | 138/30 |
| 7,717,135 B2 | * | 5/2010 | Chen | F16L 55/052 |
| | | | | 138/30 |
| 7,857,006 B2 | * | 12/2010 | Baltes | F15B 1/103 |
| | | | | 138/31 |
| 8,122,732 B2 | * | 2/2012 | Lee | F25B 41/00 |
| | | | | 62/296 |
| 8,375,976 B2 | * | 2/2013 | Sauer | A61L 2/18 |
| | | | | 137/207 |
| 8,434,524 B2 | * | 5/2013 | Barth | F15B 1/26 |
| | | | | 138/30 |
| 9,506,436 B2 | | 11/2016 | Voutilainen | |
| 10,030,660 B1 | * | 7/2018 | Mehta | F04C 29/065 |
| 2006/0266333 A1 | | 11/2006 | Li et al. | |
| 2009/0084450 A1 | | 4/2009 | Shade | |
| 2010/0043752 A1 | | 2/2010 | Yamanari | |
| 2010/0111713 A1 | * | 5/2010 | Chatfield | F16L 55/04 |
| | | | | 417/53 |
| 2014/0127047 A1 | | 5/2014 | Chatfield et al. | |
| 2018/0128410 A1 | | 5/2018 | Rogers | |
| 2018/0149287 A1 | * | 5/2018 | Huang | F16K 31/22 |

* cited by examiner

FIG. 5

PRECHARGE MANIFOLD SYSTEM AND METHOD

CROSS-REFERENCE TO RELATED APPLICATION AND CLAIM OF PRIORITY

This application claims priority under 35 U.S.C. § 119(e) to U.S. Provisional Patent Application No. 62/684,531 filed on Jun. 13, 2018. The above-identified provisional patent application is hereby incorporated by reference in its entirety.

TECHNICAL FIELD

The present application relates generally to the operation of fluid transfer systems and, more specifically, to providing a precharge manifold decrease ramp-up time in a fluid transfer system.

BACKGROUND

Fluid transfer systems circulate fluid from a pump to downstream equipment. Pulsations within the fluid can deteriorate the integrity of the pump and that of other equipment downstream from the pump. Pulsation control is the process of reducing pulsations within the fluid of a fluid transfer system. Reducing pulsations within a fluid transfer system can increase the longevity of the equipment as well as the efficiency of the overall system. Among the improvements desirable are reduced pulsation amplitudes from pumps to the downstream system and greater flexibility in integration of pulsation dampeners with other elements of an overall pump system.

A pulsation control device is designed to reduce pulsations in a fluid transfer system based on parameters of the fluid transfer system while the system is fully operational. During various periods of operation, such as while the fluid transfer system is ramping up or ramping down, the fluid transfer system might operate under different parameters and as such, the pulsation device does not perform at the peak efficiency. Therefore, there is a need for improved control to ensure that a pulsation control device performs under near operational status during period of when the system is not actually under fully operational conditions.

SUMMARY

In one aspect thereof, a pulsation dampener system includes a pump that pumps fluid through the pulsation dampener system and a pulsation dampener, located downstream from the pump, for dampening residual pulsations within the fluid. The system also includes a wye pipe located downstream of the pulsation dampener that splits the fluid into two or more flow paths. A first flow path for the fluid is located at the wye, wherein the first flow path and increases the pressure of the fluid. A second flow path for the fluid is located at the wye, that allows the fluid to flow unrestricted. The system also includes piping that receives the fluid from the first flow path and the second flow path and discharges the fluid further downstream. The system also includes a pressure sensor located upstream of the wye pipe and configured to detect the pressure of the fluid at the pulsation dampener. The system also includes a second sensor or some user supplied monitor downstream of the Wye to monitor system pressure.

In another aspect thereof method for dampening pulsation includes receiving fluid from a pump. The method also includes dampening pulsations in the fluid, using a pulsation dampener. The method further includes detecting a pressure of the fluid at the pulsation dampener. The method also includes splitting the fluid into two or more paths downstream of the pulsation dampener, the two or more paths include a first flow path and a second flow path. Additionally, the method includes increasing the pressure of the fluid, when the fluid flows through the first flow path.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged piping manifold dampener that can be used to control or partially control pulsation amplitudes.

Reciprocating systems, such as reciprocating pump systems and similar equipment, operate in many types of cyclic hydraulic applications. For example, reciprocating mud pump systems are used to circulate the mud or drilling fluid on a drilling rig. Pressure peaks as well as the magnitude of pressure pulsations within the pumped fluid hasten the deterioration of the pump, the pump's fluid end expendable parts, and equipment downstream from the pump, such as measurement equipment used to determine drilling parameters. Failure to control such pressure peaks and the magnitude of the pulsation inevitably affects the operating performance and operational life of the pump, pump fluid end expendable parts and all upstream or downstream components. Additionally, pressure peaks as well as the magnitude of pressure pulsations within the pumped fluid can interfere with instrument signal detection and/or quality of the signal detection.

Pulsation control equipment is typically placed immediately upstream or downstream from a reciprocating pump. Pulsation control equipment aids in reducing pump loads and minimizing pulsation amplitudes to the pump, the pump's fluid end expendable parts, and to equipment upstream or downstream from the pump. As a result, pulsation control equipment increases the relative operating performance and life of the pump, the pump's fluid end expendable parts, and any equipment upstream or downstream from the pump. The size and configuration of pulsation control equipment is proportional to the volume of desired fluid displacement per stroke of the pump and the maximum allotted magnitude of the pressure peaks and magnitude of the pressure pulsations that may be experienced by the pump system during each pulsation.

Different pulsation dampening systems have been developed. Common types of pulsation dampeners are a hydro-pneumatic dampener, or a gas-charged pressure vessel. A gas-charged pressure vessel contains compressed air or nitrogen and a bladder or bellows that separates the process fluid from the gas charge. A gas-charged pressure vessel can be cylindrical or roughly spherical shaped. Gas-charged pulsation dampeners may be either flow through or appendage type devices. To optimize the pulsation dampening effect, it is often preferable that the pulsation dampener be installed as close as possible to the pump discharge. At such locations, however, the presence of the pulsation dampener may interfere with installation of other system components, such as a strainer.

Regardless of the type of dampener, the performance of a pulsation dampener diminishes when the pressure of the fluid from the pump is too far from the gas precharge pressure range that the dampener is designed to handle. For example, the gas-charged pulsation dampener design typically requires the gas precharge pressure be slightly below the system pressure during normal operations, and that the pulsation dampener be properly sized for the system. Even when a pulsation dampener is installed in a drilling system, pulsations may be experienced further downstream from the pumps when the pulsation dampener is not properly sized or precharged for the system. For example, an undersized dampener cannot adequately compensate for pressure and flow fluctuations, while an oversized dampener will act as an accumulator, storing too much fluid and causing slow stabilization and delayed response to system changes. Another example is the dampener precharge pressure is too high for the system pressure, thus the system pressure cannot compress the discharge dampener precharge pressure to engage the gas to allow pulsation control to take place. When the pressure of the fluid within the pipeline is ramping-up to a pressure suitable for the drilling operation (which corresponds to a proper sized pulsation dampener), the pulsation dampener can be considered oversized since the pressure of the fluid is less than the pressure that is suitable for drilling operations. As a result, pulsations can progress downstream, since the pulsation dampener is oversized during the ramp-up period. These downstream pulsations can cause damage to the various downstream components (both equipment and sensors), increased audible noise, increase noise in sensor readings related to the drilling operation, and reduce performance of the drilling operation, when the pressure of the system is not within the pressure range the pulsation dampener is designed to handle.

Figure 1:
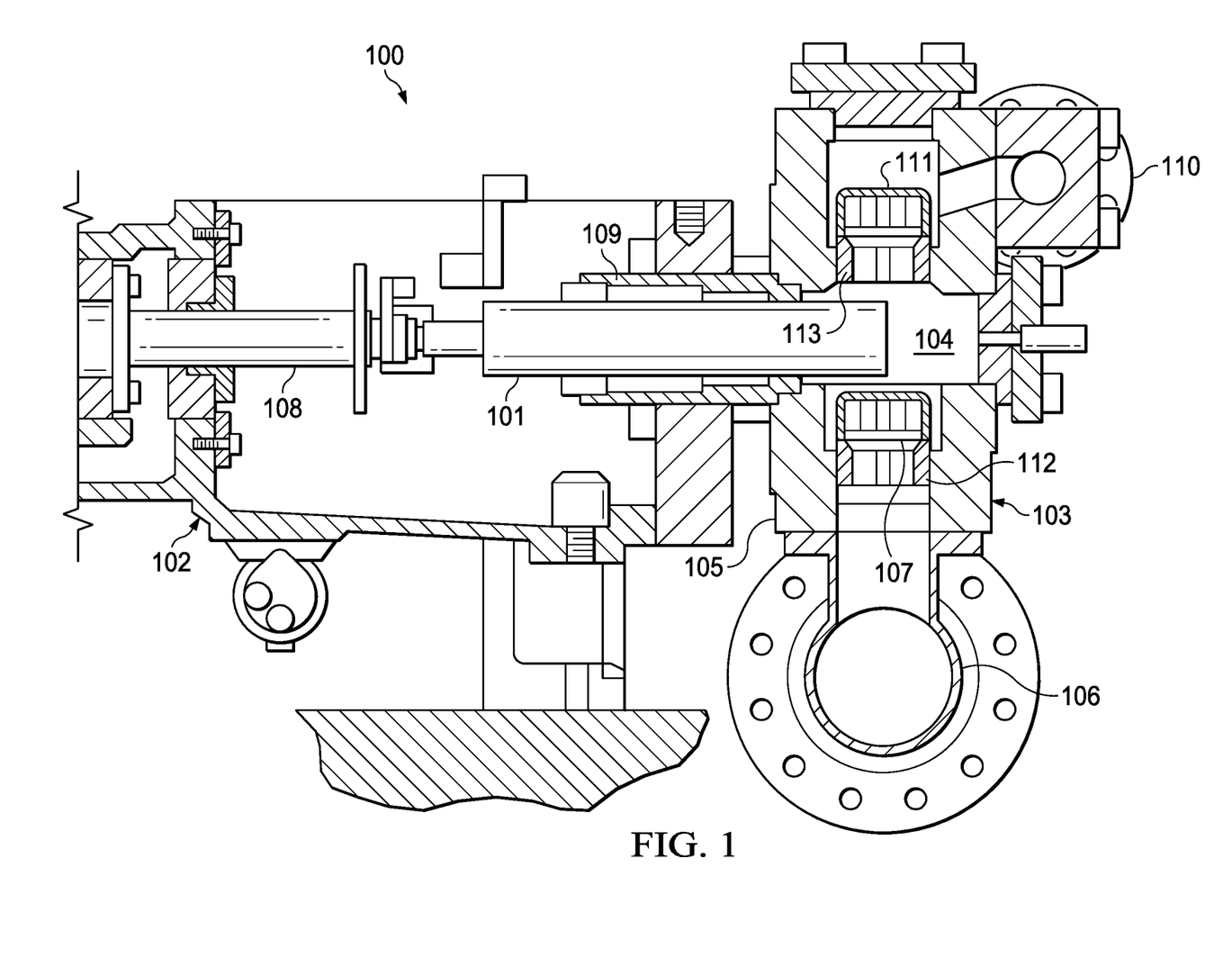
FIG. 1 illustrates a simplified cross-sectional and somewhat schematic view of a reciprocating pump system employed within pulsation dampener system with multiple flow paths according to an embodiment of the present disclosure.

FIG. 1 illustrates a simplified cross-sectional and somewhat schematic view of a reciprocating pump system 100 employed within a pulsation dampener system with multiple flow paths, according to an embodiment of the present disclosure. Generally, the reciprocating pump system 100 includes a pump suction and/or discharge pulsation control product including a gas-charged pulsation dampener or a reactive pulsation dampener according to an embodiment of the present disclosure. The reciprocating pump system 100 may employ a reciprocating pump of a type well-known and commercially available. The pump within the reciprocating pump system 100 is configured to reciprocate one or more plungers or pistons 101 (only one shown in FIG. 1). Each piston or plunger is preferably connected by a suitable rotatable crankshaft (not shown) mounted in a suitable "power end" housing 102. Power end housing 102 is connected to a fluid end structure 103 configured to have a separate pumping chamber 104 for each piston or plunger 101. Pumping chamber 104 is exposed to its respective piston or plunger 101. One such chamber 104 is shown in FIG. 1.

More specifically, FIG. 1 illustrates a simplified cross-sectional view through a typical pumping chamber 104. Fluid end 103 includes housing 105. Pumping chamber 104 receives fluid from inlet manifold 106 by way of a conventional poppet type inlet or suction valve 107 (only one shown). Piston or plunger 101, projecting at one end into chamber 104, connects to a suitable crosshead mechanism, including crosshead extension member 106. Crosshead extension member 106 is operably connected to a crankshaft or eccentric (not shown) in a known manner. Piston or plunger 101 also projects through a conventional liner or through conventional packing 109, respectively. Each piston or plunger 101 is preferably configured to chamber 104. Each piston or plunger 101 is also operably connected to inlet manifold 106 and discharge piping manifold 110 by way of a suitable suction valve 107 or discharge valve 111, as shown. Inlet manifold 106 can include a suction piping manifold that typically receives fluid from suction stabilizer (not shown in FIG. 1) or a suction piping with a suction stabilizer. Discharge piping manifold 110 typically discharges into a discharge dampener (not shown in FIG. 1). Valves 107 and 111 are of conventional design and typically spring biased to their respective closed positions. Valves 107 and 111 each also may include or be associated with removable valve seat members 112 and 113, respectively. Each of valves 107 and 111 may preferably have a seal member (not shown) formed thereon to provide fluid sealing when the valves are in their respective closed and seat engaging positions.

Those skilled in the art will recognize that the techniques of the present disclosure may be utilized with a wide variety of single and multi-cylinder reciprocating piston or plunger power pumps as well as possibly other types of positive displacement pumps. As one example, the number of cylinders of such pumps may vary substantially between a single cylinder and essentially any number of cylinders or separate pumping chambers. Those skilled in the art will also recognize that the complete structure and operation of a suitable pump system is not depicted or described herein. Instead, for simplicity and clarity, only so much of a pump system as is unique to the present disclosure or necessary for an understanding of the present disclosure is depicted and described.

Figure 2:
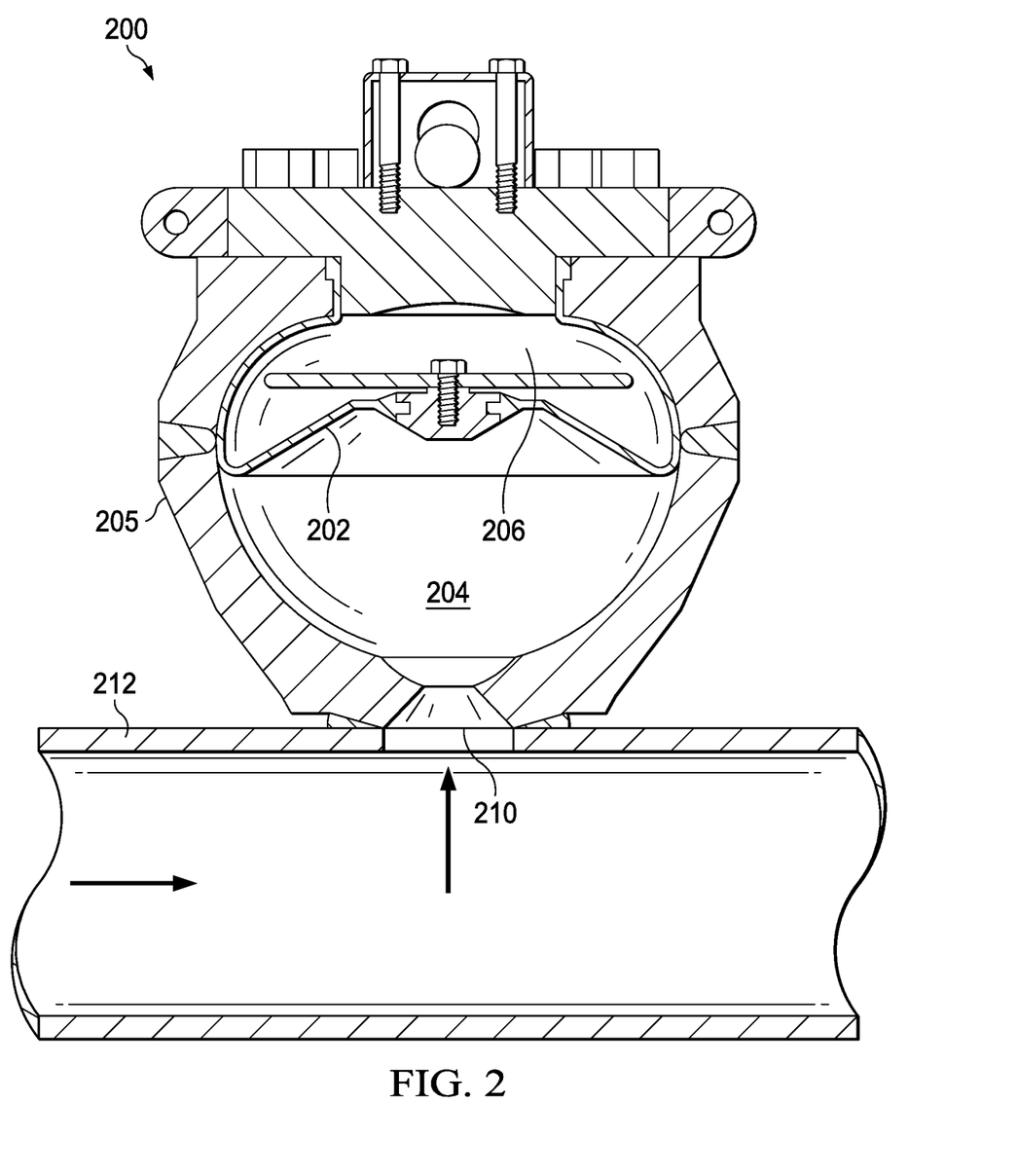
FIG. 2 illustrates a simplified, somewhat cross sectional view of a typical pulsation dampener employed within pulsation dampener system with multiple flow paths according to an embodiment of the present disclosure.

Conventional pump systems, such as the reciprocating pump system 100 shown in FIG. 1, typically include a dampener system. FIG. 2 illustrates a simplified dampener system 200. The dampener system 200 is a cross sectional view of a typical pulsation dampener 205, according to an embodiment of the present disclosure. Pulsation dampener system 200 includes a pulsation dampener 205 affixed to a pipeline 212. The pulsation dampener 205 includes a diaphragm 202, a liquid chamber 204 containing a liquid, a gas pressure chamber 206 containing a gas, and an inlet 210. FIG. 2 does not limit the scope of this disclosure to any particular implementation of a drilling system.

Pulsation dampener 205 dampens low frequency pulsations and pressure pulsations by reducing the lower frequency energies created by the pumping actions. Pulsation dampener 205 dampens pulsations contained within the fluid flowing through the pipeline 212. In certain embodiments, pulsation dampener 205 is located above the pipeline 212.

Pulsation dampeners, such as the pulsation dampener 205, are either directly attached to the discharge manifold 110 of FIG. 1, or located downstream of the pump. Generally, the pulsation dampener 205 receives "fluid" (which may be entirely liquid or which may include suspended solids—i.e., a slurry) at an inlet 210. The inlet 210 can be connected to the discharge piping manifold 110 of the reciprocating pump system 100 of FIG. 1 either directly or by intervening piping (not shown). The connection allows pumped fluid to enter the liquid chamber 204, via the inlet 210, of the pulsation dampener 205.

Fluid enters and exits the liquid chamber 204 via the inlet 210. The gas pressure chamber 206 is filled with pressurized gas to a predefined pressure, known as precharge. In certain embodiments, the pressurized gas is nitrogen ($N_2$) or another gas. A diaphragm 202 separates the gas pressure chamber 206 from the liquid chamber 204. The pressurized gas in the gas pressure chamber 206 minimizes pressure variation of the fluid by absorbing system shocks, pipe vibration, water hammering, pressure fluctuations, and the like. By minimizing pulsation in the system, the longevity of various components such as regulators, pumps, valves, sensors, and so forth is increased since wear on the components caused by the pulsations is reduced.

As the fluid passes into the liquid chamber 204 pressure from the liquid can be exerted on the diaphragm 202 causing the diaphragm 202 to compress the gas within the gas pressure chamber 206. When the pressure of gas within the gas pressure chamber 206 is increased, the gas occupies less volume, thereby increasing the volume of the liquid chamber 204. Pulsations within the fluid are then dispersed across the volume of the pressurized gas in the gas pressure chamber 206. The volume and subsequent pressure of the gas in the gas pressure chamber 206 increases and reduces in response to pressure variances of the fluid. For example, as the pressure of the fluid within the pulsation dampener 205 fluctuates, the gas in the gas pressure chamber 206 compresses thereby decreasing the pressure variance and pulsations within the fluid flowing through the pipeline 212. That is, by increasing and decreasing the volume of the gas within the gas pressure chamber 206, the amount of pressure variation in the fluids contained within the liquid chamber 204 and the pipeline 212 are reduced. The pressure pulsations of the fluid are reduced, if not negated, by increasing and decreasing the volumes of the gas within the gas pressure chamber 206. When the precharge pressure is near the system pressure, performance of the pulsation dampener 205 is improved.

The fluid that enters the liquid chamber 204 is affected by the pressure changes within the fluid. The pressure changes within fluid cause the diaphragm 202 to move, which in turn compresses and decompresses the gas in the gas pressure chamber 206. Compressing and decompressing the gas in the pressure chamber 206 dampens the pulsations within the fluid. For example, when energy from the pulsations within the fluid is transferred to the gas in the pressure chamber 206, the gas compresses, absorbing the pressure spikes from the fluid.

The precharge pressure of the gas within the gas pressure chamber 206 is preset. The precharge pressure is dependent on the anticipated pump discharge pressures (also referred to as the pump pressure) of the system. For example, if the pump discharge pressure is 5,000 pounds per square inch (PSI), then the precharge pressure of the gas is less than 5,000 PSI. However, if the precharge pressure is too low (in comparison to the pump discharge pressure), then the pulsation dampener 205 does not sufficiently dampen the flow of the fluid and internal damage can occur to components downstream as well as the dampener 205 itself. That is, when the pump discharge pressure of the fluid compresses the precharge gas beyond a threshold, the volume of the precharge gas occupied within the discharge dampener is negligible. Additionally, the bladder containing the pressurized gas, within the gas pressure chamber 206, can sustain damage from impact or it can become 'unseated.' Alternatively, if the precharge pressure is the same or higher than the pump discharge pressure then the pulsation dampener 205 does not perform any dampening.

When the pump is ramping up for a drilling operation, the current pump discharge pressure is less than the intended downstream system pressure (also referred to as system pressure) while under drilling operations. Consequently the pulsation dampener 205 does not perform any dampening, as its internal gas charge pressure could be higher than the current pump discharge pressure of the drilling system. Only after the internal pressure of the pulsation dampener 205 (which is often fixed) is less than the current pump discharge pressure, does the pulsation dampener 205 dampen pulsations within the fluid. It is noted that the pump discharge pressure is the pressure of the fluid as it is discharged from the pump, upstream of the orifice, and the downstream system pressure is the pressure of the fluid downstream of the orifice.

Figure 3A:
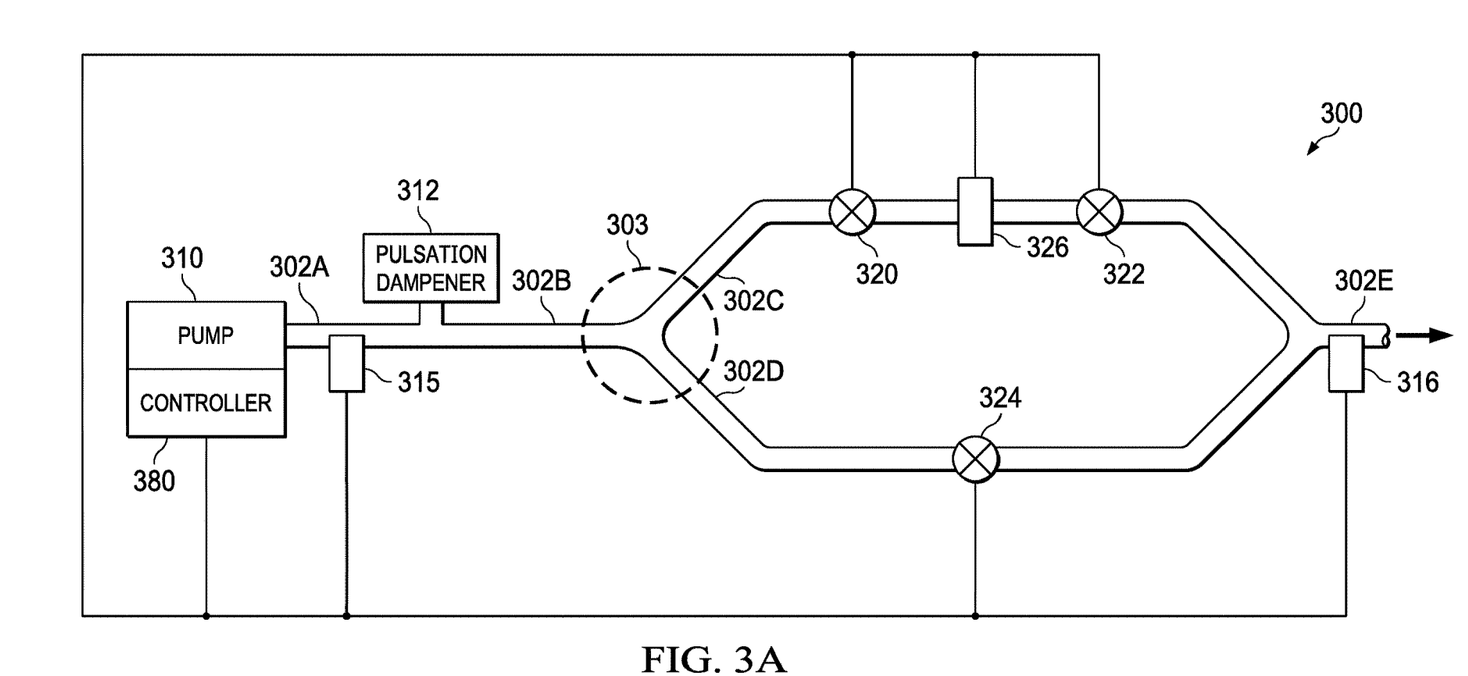
FIG. 3A illustrates diagrammatic view of a pump dampener system including a pulsation dampener installed between a pump and a multiple flow paths according to various embodiments of the present disclosure.

FIG. 3A illustrates diagrammatic view of a pump dampener system 300 including a pulsation dampener installed between a pump and a multiple flow paths, according to various embodiments of the present disclosure. FIG. 3A does not limit the scope of this disclosure to any particular embodiments of a precharge manifold system.

The pump dampener system 300 reduces pressure pulsation generated by the pumping motion of pump 310. The pump dampener system 300 is design to increase a pressure of the fluid during ramp-up operations, thereby dampening pressure pulsations earlier. The pump dampener system 300 is located before a drilling rig or system that requires a pumped fluid for operating. Pump dampener system 300 includes at least one pump 310 (similar to the reciprocating pump system 100 of FIG. 1), at least one pulsation dampener 312 (similar to the pulsation dampener system 200 of FIG. 2), at least valves 320, 322, and 324, at least pipelines 302A, 302B, 302C, 302D, and 302E as well as at least one flow restricting device, such as an orifice 326.

Pipelines 302A, 302B, 302C, 302D, and 302E represent conduit type tube to convey the fluid for the drilling operation from a first location to a second location. The pump dampener system 300 can encompass a plurality of pipelines and is not limited to pipelines 302A, 302B, 302C, 302D, and 302E. Pipelines 302A, 302B, 302C, 302D, and 302E can be made of various materials (such as steel or aluminum) and strong enough to withstand the internal pressures of the fluid from the drilling operation.

The pump 310 can be a reciprocating pump or another type of device that causes pulsations in fluids be transferred through a pipeline. The pump 310 is connected to a reservoir or other fluid containing system to move the fluid in the reservoir downstream through pipeline 302A. In certain embodiments, pump 310 represents a plurality of pumps connected to a plurality of pipelines 302A.

In certain embodiments, pulsation dampener 312 is connected to pump 310 via pipeline 302A. For example, pipeline 302A is attached to the discharge piping manifold of pump 310 (similar to discharge piping manifold 110 of FIG. 1) and the intake piping manifold of pulsation dampener 312 (similar to inlet 210 of FIG. 2). In another embodiment, pulsation dampener 312 is directly connected to pump 310, and pipeline 302A is omitted. In certain embodiments, pulsation dampener 312 represents a plurality of pulsation dampeners.

In certain embodiments, pipeline 302A includes a pressure sensor 315 to detect the pump pressure of the fluid leaving the pump 310 and entering the pulsation dampener 312. The pump pressure is important for determining the efficiency of the pulsation dampener 312. The pulsation dampener 312 is "precharged" at a certain pressure level to be optimized at the operating pressure of the fluid discharged. The efficiency of the pulsation dampener 312 is greatly reduced when the pressure of the fluid in the pipe is below the precharge pressure of the pulsation dampener 312.

The pulsation dampener 312 is also connected to the wye pipe 303 via pipeline 302*b*. Based on the reading from the pressure sensor 315 the pump dampener system 300 determines whether the pulsation dampener 312 will dampen pulsations from the pump 310. For example, based on the precharge pressure of the pulsation dampener 312 coupled with pump pressure of the fluid (as indicated by the pressure sensor 315), the pulsation dampener 312 may or may not dampen pulsations within the fluid. The pump pressure is defined as the pressure of the fluid before the wye pipe 303. The pump pressure is measured to determine the pressure of the fluid at the pulsation dampener 312.

In certain embodiments, pipeline 302B includes a pressure sensor (not shown) to detect the pressure of the fluid leaving the pulsation dampener 312 and entering the wye pipe 303. In certain embodiments, the pressure sensor 315 is located along pipeline 302B instead of pipeline 302A, as depicted.

When pump 310 is running, during a drilling operation, at its scheduled PSI, pump 310 transmits fluid into the fluid chamber (similar to liquid chamber 204 of FIG. 2) of pulsation dampener 312. The pulsation dampener 312 can include a diaphragm (similar to the diaphragm 202 of FIG. 2), and/or a pressure chamber (similar to the gas pressure chamber 206 of FIG. 2). Fluid entering the pulsation dampener 312 can contain unwanted pressure pulses and pulsations. Once the fluid is within the pulsation dampener 312, pulsations can be transmitted to the gas within the pressure chamber, dependent on various parameters such as the precharge pressure of the gas within the pressure chamber and the pump discharge pressure of the drilling operation. The pulsation dampener 312 is selected to match the operating output pressure from the pump 310. For example, if the pressure of the fluid in the pipeline is at 5,000 PSI, then the gas chamber within the pulsation dampener 312 could be precharged to a comparable pressure, such as 2,500 PSI, to reduce low frequency pulsations, pressure pulsations as well as reduces the lower frequency energies created by the pumping actions.

Typically, the fluid leaves the pulsation dampener 312 via pipeline 302B and continues through additional components and equipment used in a drilling operation (not shown in FIG. 3A).

Embodiments of the present disclosure recognize and take into consideration that when pump 310 is ramping-up at the start of a drilling operation or any other low pressure occurrence during the drilling operation, the output pressure from the pump 310 can be less than or equal to the precharge gas pressure set for the pulsation dampener 312. When the pressure in the pipeline is less than the precharge gas pressure or designed pressure of the pulsation dampener 312, the ability of the pulsation dampener 312 to reduce pulsations is decreased as the gas chamber of the pulsation dampener 312 is over-pressurized as compared to the pressure of the fluid moving within the fluid chamber of the pulsation dampener 312. The greater the difference between the pressure in the pipeline as compared to the pressure in the gas chamber of the pulsation dampener 312 the effectiveness of the pulsation dampener 312 to reduce pulsations is reduced.

Embodiments of the present disclosure provide that pipeline 302B diverts into at least two separate flow paths, to create multiple flow paths of the fluid. In certain embodiments, the split is a wye pipe 303. In certain embodiments, the wye pipe 303 is a traditional wye fitting. Wye pipe 303 could represent any type of pipe fitting that can diverge the pressurized the fluid into multiple paths or directions such as, a diverter tee, a tee fitting, or a cross fitting, to name a few. Pump dampener system 300 illustrates pipeline 302B splitting into pipeline 302C and pipeline 302D. By utilizing multiple flow paths, where at least one of the flow paths include a restriction such as orifice 326, the pump discharge pressure of the fluid can be artificially increased. By artificially increasing the pump discharge pressure of the fluid over that of the actual pump discharge pressure, the pulsation dampener 312 can be triggered earlier as the artificially increasing pump discharge pressure exceeds the precharge pressure earlier. By engaging the pulsation dampener 312 earlier, pressure pulsations from the pump can be reduced earlier, even when the pump 310 is not functioning within the intended PSI. Eventually, the multiple flow paths return to a single pipeline 302E, where the flow outputs and continues through additional components necessary in a drilling operation (not shown in FIG. 3A).

Although FIG. 3A depicts two pipelines 302C and 302D, any number of pipelines may be used. For example, instead of two flow paths (such as, pipelines 302C and 302D) branching of the pipeline 302B via wye pipe 303 into three of more branches can be utilized. It should also be understood that the volume capacity of the two pipelines 302C and 302D may be different. In addition, it should also be understood that the two pipelines 302C and 302D may be made of different sizes, shapes, and materials. In certain embodiments, pipelines 302B, 302C, 302D, and 302E are the same size, shape, and material.

Pipeline 302C, referred to as a first flow path, includes valves 320 and 322 and a restriction device such as orifice 326. Pipeline 302D, referred to as a second flow path includes valve 324. In certain embodiments, pipeline 302C includes only one valve, either valve 320 or valve 322. It should also be understood that pump dampener system 300 illustrates both valves 320 and 322 to isolate orifice 326. Valves 320, 322, and 324 are of conventional design and typically spring biased to their respective closed positions. Valves 320, 322, and 324 can include a variety of valve types including, but not limited to, a ball valve, a butterfly valve, a chock valve, a gate valve, and the like. Valves 320, 322, and 324 may preferably have a seal member (not shown) formed thereon to provide fluid sealing when the valves are in their respective closed and seat engaging positions. Pipeline 302C is individually controlled by valves 320 and 322. Pipeline 302D is individually controlled by valve 324. While pump 310 is operating at lower pumping pressure (such as in the initial startup phase), both pipelines 302C and 302D are not closed via valve 320, 322, or 324 at the same time.

Figure 3B:
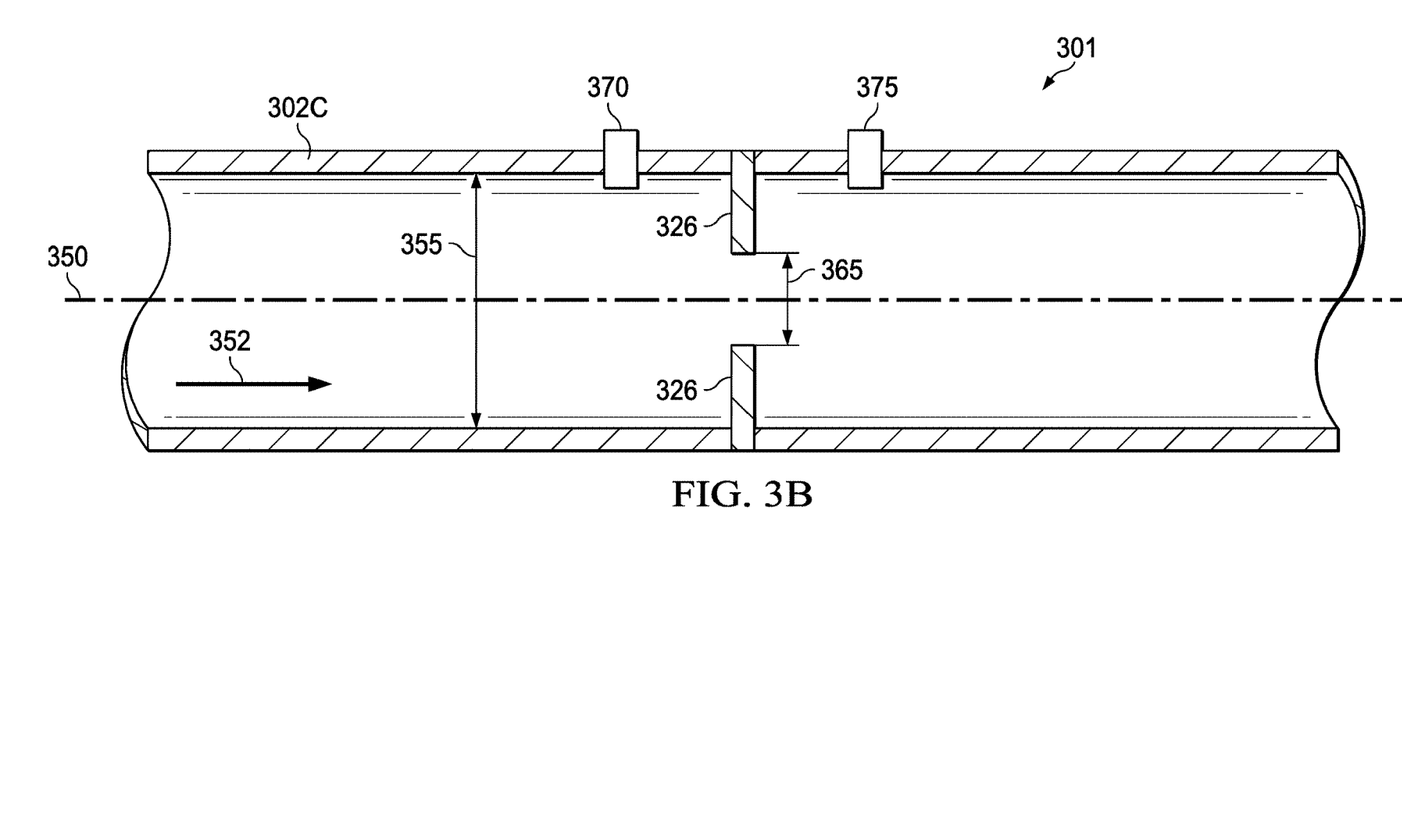
FIG. 3B illustrates a cross sectional view of a combination pipeline with a restriction according to various embodiments of the present disclosure.

Orifice 326 represents an orifice that restricts the flow of the fluid moving through pipeline 302C. FIG. 3B illustrates an example cross section of pipe restriction similar to orifice 326. In certain embodiments, the orifice 326 is an orifice plate that reduces pressure and restricts flow downstream. Since there is a direct correlation between the pressure, volume and the velocity of a fluid moving through a pipe, the orifice 326 interrupts the standard flow of the fluid. For example, when velocity of a fluid increase, the pressure increases. In contrast, when the pressure increases, the velocity increases. That is, when the flow increases or decreases the pressure will proportionally increase or decrease when the pump is a positive displacement pump. For example, when fluid passes through orifice 326, the pressure decreases and the velocity increases downstream of the orifice 326. Similarly, upstream of the orifice 326, the pressure increases and the velocity decreases as compared to downstream conditions. Increasing the pressure upstream of the orifice 326 artificially raises the pump discharge pressure. Thereby the pump 310 is pumping against a higher pressure than the pump 310 is otherwise generating. Increasing the upstream pressure allows the pulsation dampener 312 to engage and reduce pulsations earlier. By varying the size of the orifice 326, different back pressures can be attained. Specifically, varying the size of the hole in orifice 326 can vary the flow and thereby increase the back pressure by varying degrees.

Pipeline 302C is referred to as the first flow path, as the flow initially is directed through first through pipeline 302C. For example, while the pump 310 is ramping-up, in order to increase the pressure at the pulsation dampener 312 beyond the pressure as generated by the pump 310 a restriction, such as orifice 326 is utilized to increase the pressure upstream. Pipeline 302D is referred to as the second flow path, as the flow is directed through pipeline 302D, only after a predetermined downstream system pressure of the fluid is obtained. For example, when the pump 310 is ramped up to generate a pump discharge pressure capable of engaging the pulsation dampener, and the downstream system pressure is sufficient to engage precharge pressure in the discharge dampener, the artificially increased pressure via the orifice in pipeline 302C (to engage the pulsation dampener 312 earlier in the pump 310 ramp-up) is not necessary. The first flow path (via pipeline 302C) containing the orifice 326 can be essentially removed from the pump dampener system 300 by closing one or both valve(s) 320 or 322. It is noted that valve 324 is opened prior to closing valve 320 or 322 or both. By preventing fluid from flowing through the orifice 326, the pressure of the fluid is reduced to that of the pressure generated by the downstream system. By utilizing two flow paths where one flow path includes a restriction, the pressure of the fluid can be increased quicker than the pressure as generated by the pump 310 alone.

In certain embodiments, pump 310 is a positive displacement pump that displaces a constant fixed volume of fluid regardless of the pressure or velocity. For example, if the pump 310 is a positive displacement pump even though orifice 326 restricts the flow downstream of pump 310, the same volume is displaced through the orifice 326 over the same period of time. By utilizing an orifice 326, the pressure can significantly increase upstream of the orifice 326. The increased pressure allows the pulsation dampener 312 to be engaged earlier, as the pressure of the fluid is higher than the precharged pressure of the pulsation dampener 312. In certain embodiments, the precharge pressure of the pulsation dampener 312 is preset higher to better reduce pulsations when pump 310 is functioning at the system pressure, as the system pressure can be artificially achieved earlier. The pulsation dampener 312 is engaged earlier during the ramp-up and ramp-down of pump 310, and the system spends less time under low pressures. As a non-limiting example, by increasing the precharge pressure from 1,000 psi to a higher pressure such as 2,000 psi, essentially reduces pulsation magnitudes by 50%.

In certain embodiments, when pump 310 is ramping-up at the start of a drilling operation, shutting down upon completion of a drilling operation, or any other non-intended pressure drop situation, valve 324 on pipeline 302D is closed, and valves 320 and 322 on pipeline 302C are open. When the flow leaves the pulsation dampener 312, via pipeline 302B, the flow is directed to pipeline 302C. The flow is directed to pass through orifice 326. Upstream of orifice 326 (pump 310 and pulsation dampener 312) the pressure is increased. In contrast, downstream of orifice 326 (pipeline 302E) the pressure is decreased and the velocity of the flow increases. For example, when the pump 310 is ramping up, the pump is continually increasing the pressure of the fluid and the volume moving through the pipeline 302B. As the flow passes through orifice 326, the pressure upstream of orifice 326 is artificially increased, above downstream pressure. The artificial increase in pressure is not the true pressure of the drilling operation, as it is the pressure generated by the pump and the pressure created by the orifice 326. Immediately downstream of the orifice 326 the pressure is less than the downstream pressure as the velocity of the fluid increases as it passes through the orifice 326. The pump discharge pressure can be acquired via the pump 310 itself and the downstream system pressure is acquired, by a sensor 316 or other device supplied by user, a distance downstream from the orifice 326 when the flow returns to its system pressure as generated by the pump 310. The system pressure is measured by sensor 316 to determine the pressure of the fluid to be discharge downstream. The system pressure can be used to determine when to close the valve 320 on the pipeline 302C and open the valve 324 on pipeline 302D.

When then pump discharge pressure is above the precharge pressure of the pulsation dampener 312, the valve 324 is open on pipeline 302D. The flow is then directed to either pipeline 302C or pipeline 302D from pipeline 302B. The pressure of the system returns to the pump discharge pressure, as the flow can bypass the orifice 326 in pipeline 302C by traversing pipeline 302D. Thereafter, the valve 320, the valve 322, or both, is closed to direct the flow only through pipeline 302D. The flow is then directed from the pulsation dampener 312 through pipelines 302B and 302D and the flow is outputted to the remainder of the drilling system (not shown in FIG. 3A) through pipeline 302E.

In certain embodiments, multiple flow paths are possible, where each flow path but one includes a restriction of varying amounts to incrementally increase and decrease the upstream pressure. For example, each pipeline can have a set of valves and an orifice of varying diameter size, in order to control the pressure during ramp up or during instances when the operating pressure is less than the pressure that is needed by the pulsation dampener 312 to effectively reduce pulsations. For example, the flow may be split into three or more flow paths, with each path with an increasing (or decreasing) orifice diameter size and one pipeline with no restricting orifice. This allows the transition from a restricted pipe to a free flowing pipe, and a pressure drop associated with the transition to be reduced as the system can transition through multiple restricted pipes (each with a different restriction), and maintain the downstream system pressure within a range to engage the pulsation dampener 312. Each valve(s) associated with a pipe that includes a restriction can open and close to direct the fluid to flow into pipe or prevent the fluid from flowing into the pipe. This allows more control of the pressure to be obtained to maintain a pressure level above a threshold to keep the pulsation dampener 312 engaged.

In certain embodiments, valves 320, 322, and 324 can be manual valves or controlled automatically by a drilling system to maintain a pump discharge pressure from the pump through the downstream system. For example, the system monitors the pressure within the pipelines at various intervals, such as at pipeline 302A (downstream of pump 310 as the flow enters pulsation dampener 312) the pressure at pipeline 302B (downstream of pulsation dampener 312), and at pipeline 302E, to identify when the back pressure created by the orifice 326 (the pump discharge pressure that is upstream of the orifice) is no longer necessary to engage the pulsation dampener 312. That is, when the pump 310 generates enough pressure to engage the pulsation dampener 312 without the need of the back pressure created by the orifice 326, the flow can be unrestricted. Thereafter, the system can open the valve 324 on pipeline 302D to allow the flow to pass through both pipelines 302C and 302D. Then the system can close one or both valves 320 and 322, essentially removing the orifice 326 from the system, thereby eliminating the back pressure created by the orifice 326.

In certain embodiments, the orifice 326 is a restriction device that acts as a pressure increasing apparatus, such as a pressure regulating valve. A pressure regulating valve is a valve that reduces input to a specified output pressure. The pressure increasing unit can have a preset pressure or can be dynamically controlled to increase or decrease the back pressure as needed to engage the pulsation dampener 312.

In certain embodiments, the orifice 326 can be a variable diameter orifice. A variable diameter orifice can regulate the back pressure without the need for three or more flow paths each with a different sized orifice to incrementally increase or decrease the back pressure.

FIG. 3B illustrates a cross sectional view 301 of a combination pipeline 302C with a restriction (similar to orifice 326 of FIG. 3A) according to various embodiments of the present disclosure. Cross sectional view 301 is an enlarged view of orifice 326 of FIG. 3A. FIG. 3B does not limit the scope of this disclosure to any particular embodiments of a precharge manifold system.

The cross sectional view 301 illustrates pipeline 302C with a diameter 355 and the direction of flow illustrated by arrow 352. Cross sectional view 301 includes orifice 326, pressure sensor 370, and pressure sensor 375.

Orifice 326 is an orifice plate that is typically used to measure the rate of flow of a fluid through the plate by placing pressure sensors directly upstream and downstream of the orifice plate. The flow rate through the orifice plate can be derived based on comparing the two diameters that of the pipeline diameter 355 and the orifice diameter 365.

The pipeline 302C has a center line depicted by dashed line 350. Orifice 326 has an opening that is sized according to the diameter 365. By comparing the pressure via pressure sensor 370 (upstream of the orifice 326) and the pressure sensor 375 (downstream of the orifice 326) along with the ratio of the diameter 355 of the pipeline 302C with the diameter 365 of the orifice 326 the flow rate can be derived for the fluid flowing through the pipeline 302C. Similarly, based on the ratio of the diameter 355 of the pipeline 302C with the diameter 365 of the orifice 326 the back pressure can be derived as the pump 310 ramps-up. For example, if pump 310 (of FIG. 3A) is a positive displacement pump that displaces an average volume of fluid regardless of the pressure or velocity, and the diameters 355 and 365 are fixed, as the pump 310 ramps-up the pressure increases to engage the pulsation dampener 312, earlier. In certain embodiments, the pressure sensors 370 and 375 can be located further upstream and downstream respectively from the orifice 326. In certain embodiments, additional pressure sensors can be located through 300 of FIG. 3A.

Figure 4:
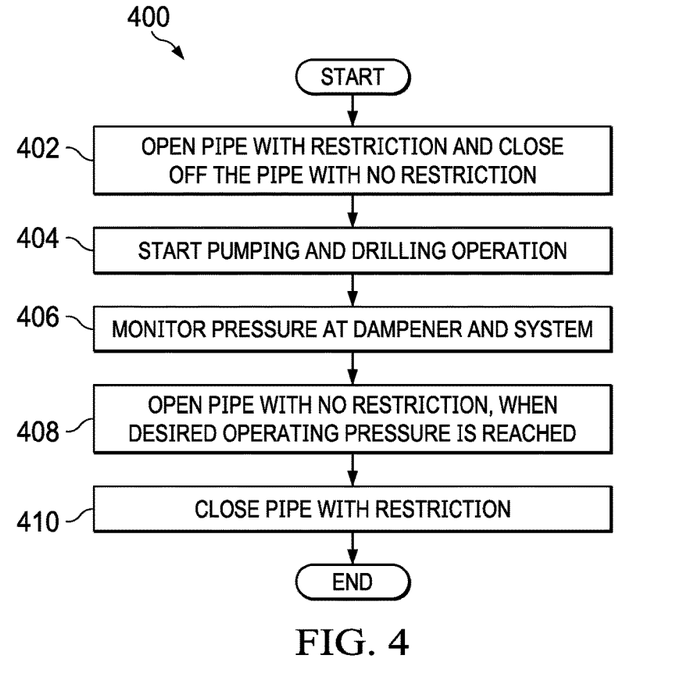
FIG. 4 illustrates a flowchart of a fluid delivery and pulsation dampening system with multiple flow paths according to various embodiments of the present disclosure.

FIG. 4 illustrates a flowchart of a fluid delivery and pulsation dampening system 400 of the pump dampener system 300 with multiple flow paths, according to various embodiments of the present disclosure. FIG. 4 does not limit the scope of this disclosure to any particular embodiments of a precharge manifold system.

In operation 402, the piping with the restriction is opened via valve 320, 322, or both, while the piping without the restriction (such as a free flowing pipe) is closed. Prior to engaging the pump (similar to pump 310 FIG. 3A) to commence ramping-up to the pump discharge pressure, the fluid is pre-directed to flow from the pump to the pulsation dampener (similar to the pulsation dampener 312 of FIG. 3A) to the pipeline with the restriction. For example, the fluid is pre-directed to flow from the pump 310 to pipeline 302C (of FIG. 3A) via wye pipe 303 (of FIG. 3A), in order for the back pressure to be increased via the orifice 326 (of FIG. 3A).

A controller 380 can monitor the sensors 315 and 316, receive operation information, and control valves 320, 322 and 3234. "Receive" can mean that receiving from a memory, receiving inputs from a user, etc. The operation information can include a pressure threshold, precharge pressure of the pulsation dampener, etc. The pressure threshold can be a determination of addition of the precharge pressure and the pressure drop in the restricted flow path. For example, when the pressure drop is 2500 psi and the precharge pressure 3000 psi, the pressure threshold would be 5500 psi. The controller 380 can use the pressure threshold in determining when to switch from the restricted flow path to the open flow path.

In operation 404, the pump (similar to pump 310 of FIG. 3A) is activated to start the drilling operation, thereby pumping fluid through the pipeline with the restriction (such as pipeline 302C with orifice 326 of FIG. 3). As the pump is ramping-up, the restriction increases the pressure upstream, where the pulsation dampener is located. By the pressure increasing quicker than the pressure that is naturally generated by the system, the pulsation dampener can be engaged earlier in the drilling operation. While the pump is active, the fluid leaves the pipeline 302C and merges into the pipeline 302E and continues through the rest of the system at the downstream system pressure as generated by the pump.

The controller 380 can determine that the pump pressure is below the operating pressure or the precharge pressure of the pulsation dampener. The controller 380 can close the valve on the open flow path and open the valve or valves on the restricted flow path.

In operation 406, the pressure is monitored at a pulsation dampener as well as down stream of the orifice. In certain embodiments, the pressure is monitored at the pulsation dampener, upstream of the restriction, or downstream of the restriction or a combination thereof. The pressure is monitored at or near the pulsation dampener to allow an operator or the system to derive when the pulsation dampener is engaged based on the pump discharge pressure of the fluid and the precharge pressure of the pulsation dampener.

The controller 380 can determine that the pump pressure has reached a pressure threshold. The pressure threshold is a pressure measurement for indicating when the pump pressure is sufficient to switch from the restricted flow path to the open flow path. The pressure threshold is determined using a combination of the precharge pressure of the pulsation device and a pressure drop of the restricted flow path. The controller 380 can also determine that the system pressure after the discharge piping has reached an operating pressure or the precharge pressure of the pulsation dampener.

In operation 408, when the desired pump discharge pressure is reached, the pipe without the restriction is opened via a valve, thereby allowing the fluid to flow through both the piping with the restriction and the piping without the restriction. For example, the fluid can flow through both pipeline 302C and 302D of FIG. 3. In certain embodiments, both pipelines are opened via valves that are controlled by a control system that monitors the pressure to ensure the pulsation dampener is operating effectively. In certain embodiments, both pipelines are opened for a short period of time to prevent a large pressure drop that would cause the pulsation dampener to become ineffective at dampening pulsations caused by the pump. The fluid leaves the pipeline 302C and 302D and merges together into pipeline 302E where the fluid continues through the rest of the system at the pump discharge pressure. The pump discharge pressure and the downstream system pressure are similar.

In operation 410, the piping with the restriction is closed via at least one valve. For example, by closing valve 320 or 322 or both, the flow is directed only through pipeline 302D from pipeline 302B. The fluid leaves the pipeline 302D and merges into the pipeline 302E and continues through the rest of the system at the pump discharge pressure.

Once controller 380 has determined that the pump pressure has reached the pressure threshold or that the system pressure has reached the operating pressure, the controller 380 can open the valve on the unrestricted flow path and close the valve or valve on the restricted flow path.

Although FIG. 4 illustrates one example of a pulsation dampening system 400, various changes may be made to FIG. 4. For example, while shown as a series of steps, various steps in FIG. 5 could overlap, occur in parallel, or occur any number of times.

Figure 5:
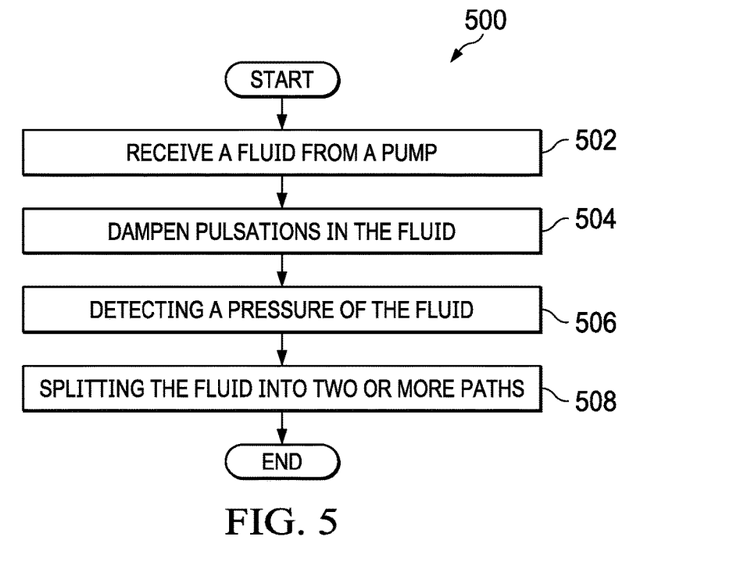
FIG. 5 illustrates a flowchart of a fluid delivery and pulsation dampening system with multiple flow paths according to various embodiments of the present disclosure.

FIG. 5 illustrates a flowchart of a fluid delivery and pulsation dampening system 500 of the pump dampener system 300 with multiple flow paths, according to various embodiments of the present disclosure. FIG. 5 does not limit the scope of this disclosure to any particular embodiments of a precharge manifold system.

In operation 502, the pump dampener system 300, of FIG. 3A receives a fluid from a pump. The fluid can be used in drilling operations. The pump can be a positive displacement pump, such that the volume of fluid moved by the pump does not change, unless the pump revolutions per minute (RPM) change or the piston diameter changes. For example, when the pump is ramping up, the RPM of the pump is changes as the pump starts from a stationary position to a RPM that is used under general operating conditions.

In operation 504, a pulsation dampener can be located downstream of the pump and dampens any pulsations generated by the pump. The pulsation dampener can be sized based on the general operating conditions of the system. While the pump is ramping up, the pulsation dampener may not effectively reduce pulsations as compared to the general operating conditions of the system.

In operation 506, a pressure sensor can detect the pump pressure of the fluid. In operation 508, the fluid can be split into two or more paths. When the fluid is split into two paths, one path is unrestricted while the other path includes a restriction. The restriction can artificially increase the pressure of the fluid to engage the pulsation dampener earlier. When the fluid is split into three or more paths, one path is unrestricted, while every other path includes a restriction to artificially increase the pressure of the fluid, to different pressures to engage the pulsation dampener earlier.

Although FIG. 5 illustrates one example of a pulsation dampening system 500, various changes may be made to FIG. 5. For example, while shown as a series of steps, various steps in FIG. 5 could overlap, occur in parallel, or occur any number of times.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A pulsation dampener system, comprising:
   a pump configured to pump fluid through the pulsation dampener system;

a pulsation dampener located downstream from the pump and configured to dampen pulsations within the fluid;
a pressure sensor located downstream from the pump and configured to detect a pump pressure of the fluid at the pulsation dampener;
a wye pipe located downstream of the pulsation dampener and the pressure sensor and is structured to divert the fluid between two or more flow paths;
a first flow path located after the wye pipe and configured to increase the pump pressure of the fluid upstream to the pump when the fluid is diverted to the first flow path;
a second flow path located after the wye pipe and configured to maintain the pump pressure of the fluid upstream to the pump when the fluid is diverted to the second flow path; and
piping configured to converge the first flow path and the second flow path and discharge the fluid further downstream.

2. The pulsation dampener system of claim 1, wherein the first flow path includes a restriction configured to increase the pump pressure of the fluid upstream of the first flow path.

3. The pulsation dampener system of claim 2, wherein the restriction is one of:
an orifice,
a variable diameter orifice, or
a pressure regulating valve.

4. The pulsation dampener system of claim 1, wherein:
the first flow path includes a first valve configured to control a fluid flowing within the first flow path, and
closing the first valve diverts the fluid to the second flow path.

5. The pulsation dampener system of claim 1, wherein:
the second flow path includes a second valve configured to control the fluid flowing through the second flow path, and
closing the second valve diverts the fluid to the first flow path.

6. The pulsation dampener system of claim 1, further comprising:
a controller configured to:
receive, from the pressure sensor, the pump pressure of the fluid detected at the pulsation dampener, and
control a first valve in the first flow path and a second valve in the second flow path based on the pump pressure of the fluid at the pulsation dampener and an operating pressure of the system based on a precharge pressure of the pulsation dampener.

7. The pulsation dampener system of claim 6, wherein the controller is further configured to:
when the pump pressure is below the pulsation dampener precharge pressure, close the second valve to divert the fluid into the first flow path increasing the pump pressure of the fluid at the pulsation dampener above the pulsation dampener precharge pressure due to a restriction in the first flow path.

8. The pulsation dampener system of claim 6, wherein the controller is further configured to:
when the pump pressure of the fluid reaches a pressure threshold, close the first valve to divert the fluid into the second flow path maintaining the pump pressure of the fluid at the pulsation dampener.

9. The pulsation dampener system of claim 6, further comprising:
a second pressure sensor located in the piping and configured to detect a system pressure in the piping,
wherein the controller is further configured to:
receive, from the second pressure sensor, the system pressure of the fluid detected at the piping, and
when the system pressure of the fluid in the piping reaches the operating pressure range of the pulsation dampener, close the first valve and open the second valve to divert the fluid into the second flow path.

10. The pulsation dampener system of claim 1, wherein the pulsation dampener is a gas-charged or a reactive-charged dampener.

11. A method for dampening pulsation in a pulsation dampener system, comprising:
pumping, using a pump, fluid through the pulsation dampener system;
dampening, using a pulsation dampener located downstream form the pump, pulsations in the fluid;
detecting, using a pressure sensor located downstream from the pump, a pump pressure of the fluid at the pulsation dampener;
diverting, using a wye pipe located downstream of the pulsation dampener and the pressure sensor, the fluid between two or more flow paths;
increasing the pump pressure of the fluid upstream to the pump when the fluid is diverted to a first flow path located after the wye pipe;
maintaining the pump pressure of the fluid to flow upstream to the pump when the fluid is diverted to a second flow path located after the wye pipe; and
discharging the fluid downstream of the pulsation dampener system using piping after converging the first flow path and the second flow path.

12. The method of claim 11, further comprising increase the pump pressure of the fluid upstream of the first flow path using a restriction in the first flow path.

13. The method of claim 12, wherein the restriction is one of:
an orifice,
a variable diameter orifice, or
a pressure regulating valve.

14. The method of claim 11, further comprising:
closing a first valve, located in the first flow path, to divert the fluid to the second flow path.

15. The method of claim 11, further comprising:
closing a second valve, located in the second flow path, to divert the fluid to the first flow path.

16. The method of claim 11, further comprising:
controlling, using a controller, a first valve located in the first flow path and a second valve located in the second flow path based on the pump pressure of the fluid at the pulsation dampener and an operating pressure based on a precharge pressure of the pulsation dampener.

17. The method of claim 16, further comprising:
when the pump pressure is below the pulsation dampener precharge pressure, close the second valve to divert the fluid into the first flow path increasing the pump pressure of the fluid at the pulsation dampener above the pulsation dampener precharge pressure due to a restriction in the first flow path.

18. The method of claim 16, further comprising:
when the pump pressure of the fluid reaches a pressure threshold, closing the first valve to divert the fluid into the second flow path maintaining the pump pressure of the fluid at the pulsation dampener.

19. The method of claim 16, further comprising:
receiving, from a second pressure sensor located in the piping, a system pressure in the piping; and
when the system pressure of the fluid at the piping reaches the operating pressure range of the pulsation dampener, closing the first valve and opening the second valve to divert the fluid into the second flow path.

20. The method of claim 11, wherein the pulsation dampener is a gas-charged or a reactive-charged dampener.

* * * * *